US012567577B2

(12) United States Patent
Wang et al.

(10) Patent No.: US 12,567,577 B2
(45) Date of Patent: Mar. 3, 2026

(54) ALL-SOLID-STATE IRON-AIR BATTERY

(71) Applicant: SHANGHAI INSTITUTE OF APPLIED PHYSICS, CHINESE ACADEMY OF SCIENCES, Shanghai (CN)

(72) Inventors: Jianqiang Wang, Shanghai (CN); Cheng Peng, Shanghai (CN); Shiyu Zhang, Shanghai (CN); Liwei Cheng, Shanghai (CN); Yun Yang, Shanghai (CN); Chengzhi Guan, Shanghai (CN); Guoping Xiao, Shanghai (CN)

(73) Assignee: SHANGHAI INSTITUTE OF APPLIED PHYSICS, CHINESE ACADEMY OF SCIENCES, Shanghai (CN)

( * ) Notice: Subject to any disclaimer, the term of this patent is extended or adjusted under 35 U.S.C. 154(b) by 564 days.

(21) Appl. No.: 18/002,261

(22) PCT Filed: Feb. 25, 2021

(86) PCT No.: PCT/CN2021/074351
§ 371 (c)(1),
(2) Date: Dec. 17, 2022

(87) PCT Pub. No.: WO2021/253837
PCT Pub. Date: Dec. 23, 2021

(65) Prior Publication Data
US 2023/0275212 A1     Aug. 31, 2023

(30) Foreign Application Priority Data
Jun. 18, 2020     (CN) .......................... 202010561273.9

(51) Int. Cl.
H01M 4/136 (2010.01)
H01M 4/02 (2006.01)
(Continued)

(52) U.S. Cl.
CPC ........... H01M 4/136 (2013.01); H01M 4/131 (2013.01); H01M 10/0562 (2013.01);
(Continued)

(58) Field of Classification Search
CPC ................. H01M 4/136; H01M 4/131; H01M 10/0562; H01M 12/08; H01M 50/431;
(Continued)

(56) References Cited

U.S. PATENT DOCUMENTS

| | | | |
|---|---|---|---|
| 2003/0027033 A1* | 2/2003 | Seabaugh ............... | C04B 35/50 264/618 |
| 2012/0058396 A1* | 3/2012 | Lu ........................... | H01M 4/38 429/221 |
| 2019/0067724 A1* | 2/2019 | Ohmori ............... | H01M 8/0258 |

FOREIGN PATENT DOCUMENTS

| | | |
|---|---|---|
| CN | 111653790 A | 9/2020 |
| JP | 2013165052 A | 8/2013 |
| WO | 2012033623 A1 | 3/2012 |

OTHER PUBLICATIONS

Trocino et al. "High performance solid-state iron-air rechargeable ceramic battery operating at intermediate temperatures (500-650° C. )", Applied Energy, vol. 233, ISSN: 0306-2619, pp. 386-394 (Year: 2019).*

(Continued)

*Primary Examiner* — Daniel S Gatewood
(74) *Attorney, Agent, or Firm* — Jon Shackelford; Jacob M. Ward; Ward Law Office LLC

(57) ABSTRACT

The present invention relates to an all-solid-state iron-air battery, which comprises a positive electrode, a negative electrode, a separator and a solid electrolyte, wherein the positive electrode and the negative electrode are respectively arranged on opposite sides of the solid electrolyte; the separator is arranged between the negative electrode and the solid electrolyte to form a sandwich structure; the negative (Continued)

electrode is a ferrate material formed from an alkali metal-doped iron oxide; the positive electrode is a metal or a metal oxide material with an efficient redox catalytic activity; the solid electrolyte is an electrolyte material capable of efficiently conducting oxygen ions; and the separator is a film-like or sheet-like material having oxygen ion conduction and electronic insulation performances. According to the all-solid-state iron-air battery of the present invention, in the negative electrode, by introducing the alkali metal into an iron oxide crystal lattice by means of doping, the electrochemical reaction activity of the iron electrode can be remarkably improved, the potential safety hazard problem caused by battery overcharging is improved, and the performance of the iron-air battery is remarkably improved; and the separator is arranged between the solid electrolyte and the negative electrode, such that the battery electric leakage problem can be effectively relieved.

7 Claims, 2 Drawing Sheets

(51) Int. Cl.
| | |
|---|---|
| *H01M 4/131* | (2010.01) |
| *H01M 10/0562* | (2010.01) |
| *H01M 12/08* | (2006.01) |
| *H01M 50/431* | (2021.01) |

(52) U.S. Cl.
CPC ......... *H01M 12/08* (2013.01); *H01M 50/431* (2021.01); *H01M 2004/027* (2013.01); *H01M 2004/028* (2013.01); *H01M 2300/0077* (2013.01)

(58) Field of Classification Search
CPC ..... H01M 2004/027; H01M 2004/028; H01M 2300/0077; H01M 4/9016; H01M 4/9033; H01M 2004/8689; H01M 4/86; H01M 12/06; H01M 2004/8684; H01M 2300/0074; Y02E 60/10
See application file for complete search history.

(56) References Cited

OTHER PUBLICATIONS

Liu et al. "Critical advances for the iron molten air battery: a new lowest temperature, rechargeable, ternary electrolyte domain" Journal of Materials Chemistry A, vol. 3, No. 42,ISSN: 2050-7488, pp. 21039-21043 (Year: 2015).*

Eigen et al. "Redox cycling stability of Fe2NiO4/YSZ composite storage materials for rechargeable oxide batteries" Energy Storage Materials, vol. 28, pp. 112-121 (Year: 2020).*

Eigen et al. "Redox cycling stability of Fe2NiO4/YSZ composite storage materials for rechargeable oxide batteries" Energy Storage Materials, vol. 28, pp. 112-121,Mar. 3, 2020.

Licht et al."Molten air—a new, highest energy class of rechargeable batteries" Energy & Environmental Science, vol. 6 , pp. 3646-3657, Sep. 12, 2013.

Liu et al. "Critical advances for the iron molten air battery: a new lowest temperature, rechargeable, ternary electrolyte domain"Journal of Materials Chemistry A, vol. 3, No. 42,ISSN: 2050-7488, pp. 21039-21043, Sep. 9, 2015.

Peng et al."A Rechargeable High-Temperature Molten Salt Iron-Oxygen Battery" ChemSusChem, vol. 11,pp. 1880-1886, May 15, 2018.

Shiyu. "High Temperature Molten Salt Metal Air Batteries and the Electrolyte and Electrode Materials",Engineering and Technology of Full Text Database of Master's Degree Thesis of CNKI, Series I,Issue 7, pp. B015-B411, Jul. 15, 2019.

Trocino et al. "High performance solid-state iron-air rechargeable ceramic battery operating at intermediate temperatures (500-650° C. )", Applied Energy, vol. 233,ISSN: 0306-2619, pp. 386-394, Jan. 1, 2019.

Xin."Research on the system construction and performance of high energy density molten salt iron air battery", Science and Engineering of the Master's Thesis Database of CNKI, Part B, pp. 22-25, Jan. 17, 2017.

* cited by examiner

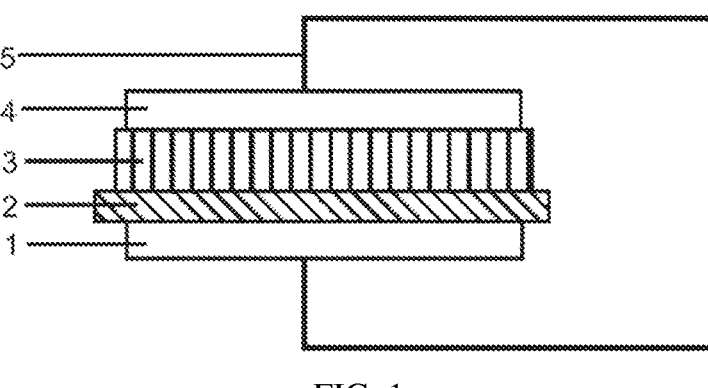
FIG. 1
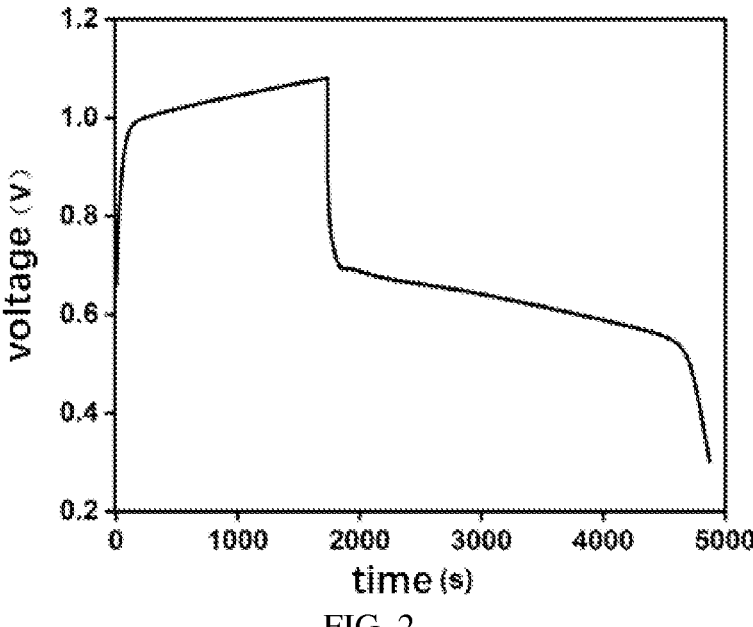
FIG. 2
FIG. 3

ALL-SOLID-STATE IRON-AIR BATTERY

FIELD OF THE INVENTION

The present invention relates to an iron-air battery, and more specifically to an all-solid-state iron-air battery.

BACKGROUND OF THE INVENTION

A metal-air battery can be charged and discharged to store energy by the redox process of metal. The capacity of the metal-air battery is much higher than that of the conventional energy storage battery. The metal-air battery is especially suitable for large-scale power grid energy storage applications. Iron is the fourth most abundant element in the earth's crust. Iron is plentiful, low cost and easy oxidation, and has a variety of stable oxidation states. Thus, iron is a potential metal electrode material. The theoretical energy density of the iron-air battery is 2000 Wh/kg, which is sufficient for a series of energy storage applications.

The electrochemical reaction rate can be significantly increased at a high temperature, wherein the energy generated by the redox reaction of the active substance can be used as much as possible, thus the energy utilization rate of the battery can be effectively improved. In recent years, due to policies of comprehensive utilization of energy based on industrial waste heat, excess heat or the like, the investment in research on the high-temperature battery is also increasing. The research work on the high-temperature iron-air battery has also been reported. In 2013, the Stuart Licht's team at George Washington University disclosed a high-temperature molten salt iron-air battery assembled by molten $Li_2CO_3$ salt and $Li_{0.87}Na_{0.63}K_{0.5}CO_3$ eutectic molten salt as the electrolyte, wherein the high-current charging and discharging cycles are realized in the molten salt battery. In 2017, the research team of the Shanghai Institute of Applied Physics, Chinese Academy of Sciences disclosed a high-temperature molten salt iron-air battery with two-phase electrolyte, wherein a high-temperature conductive ceramic YSZ sheet is used to isolate the liquid molten salt from the positive electrode of the battery. However, the liquid molten salt exhibits a readiness to flow and can only be used for static energy storage applications. In addition, the positive and negative electrodes are difficult to be held in place by the liquid molten salt, so that there are technical difficulties in the amplification of the high-temperature iron-air battery. Further, air is the active substance of the positive electrode of the iron-air battery, so that the positive electrode is exposed to the air, forming a semi-open battery structure. However, the liquid molten salt at a high temperature is prone to volatilization, and the semi-open battery structure has the safety hazard caused by electrolyte drying up, thus the sealing is also essential for the battery. The corrosion to positive electrode and sealing caused by the high-temperature molten salt is also an important factor affecting the long-term operation stability of the battery. In view of the above problems, it is obvious that it is more difficult to apply the high-temperature molten salt battery for large-scale energy storage applications than the conventional battery. The liquid molten salt can be replaced with the solid electrolyte. Such replacement can effectively solve a series of problems caused by the high-temperature molten salt. In the past two years, the research on the high-temperature all-solid-state iron-air battery was mainly set forth by Italian CNR-ITAE, who disclosed an all-solid-state iron-air battery, wherein the electrolyte was $La_{0.8}Sr_{0.2}Ga_{0.8}Mg_{0.2}O_3$ (LSGM) with excellent oxygen ion conduction performance under the temperature of 600-800° C., wherein the negative electrode was $C_{0.8}Gd_{0.2}O_2$ mixed with $Fe_2O_3$ (Fe-CGO), and wherein the air electrode was $La_{0.6}Sr_{0.4}Fe_{0.8}Co_{0.2}O_3$ (LSFCO). The actual energy density of the battery was as high as 460 Wh/kg, and the capacity was as high as 0.5 Ah/g, which was a great improvement over other types of batteries.

There is still a lot of room for improvement for all-solid-state iron-air battery in consideration of the theoretical parameters of the iron-air battery. In the negative electrode, the active substance of iron oxide is simply mixed with CGO powder. During the operation of the battery, the redox reaction of iron can easily lead to the stratification of iron oxide and CGO, thereby greatly increasing the internal resistance of the battery, increasing the internal consumption of the battery, and affecting the battery performance. Therefore, it is important to prepare the negative electrode with an efficient redox catalytic activity. In addition, the theoretical open circuit voltage of iron-air battery is 1.2V, but the Ce ion in the solid electrolyte is prone to being reduced to metal cerium at a voltage higher than 1V, which increases the electronic conductivity of the electrolyte, so that there is electric leakage behavior during the operation of the battery, which reduces the battery life.

SUMMARY OF THE INVENTION

In order to solve the problems of low activity of the negative electrode, electric leakage of the battery, or the like in the prior art, the present invention provides an all-solid-state iron-air battery.

The all-solid-state iron-air battery according to the present invention comprises a positive electrode, a negative electrode, a separator and a solid electrolyte, wherein the positive electrode and the negative electrode are respectively arranged on opposite sides of the solid electrolyte; the separator is arranged between the negative electrode and the solid electrolyte to form a sandwich structure; the negative electrode is a ferrate material formed from an alkali metal-doped iron oxide; the positive electrode is a metal or a metal oxide material with an efficient redox catalytic activity; the solid electrolyte is an electrolyte material capable of efficiently conducting oxygen ions; and the separator is a film-like or sheet-like material having oxygen ion conduction and electronic insulation performances.

In view of high-temperature solid oxide fuel cell (SOFC) technology, the present invention provides a new stable all-solid-state iron-air battery, wherein the all-solid electrolyte capable of efficiently conducting oxygen ions introduced into the high-temperature iron-air battery, and wherein the negative electrode is the alkali metal-doped iron oxide material. In particular, the active substances of positive and negative electrodes of SOFC are gases, while the active substance of the negative electrode of the high-temperature iron-air battery of the present invention is the iron. The present application involves the activity of iron electrode since the iron is generally solid. However, the activity of iron electrode does not need to be involved in SOFC. Further, the separator is creatively introduced in the present invention to relieve the electrolyte electric leakage behavior caused by battery overcharging.

Preferably, the positive electrode is at least one metal or metal oxide conductive material selected from a group consisting of silver (Ag), platinum (Pt), lanthanum strontium manganese oxygen, also known as lanthanum strontium manganite (LSM), lanthanum strontium ferrite cobalt oxygen, also known as strontium-doped lanthanum ferrite-cobaltite (LSFCO) and barium strontium cobalt ferrite (BSCF). It should be understood that the positive electrode can also be other metal or metal oxide material with efficient redox catalytic activity.

Preferably, the solid electrolyte is an oxygen ion conductor suitable for operating at the temperature of 600-1000° C. Correspondingly, the operating temperature of the all-solid-state iron-air battery is 600-1000° C.

Preferably, the solid electrolyte is at least one oxygen ion conductor selected from a group consisting of doped cerium oxide (GDC, SDC), alkali metal-doped lanthanum gallium oxygen, also known as alkaline metal-doped lanthanum gallate (LSGM), yttria stabilized zirconia (YSZ) and scandium oxide stabilized zirconia (SSZ).

Preferably, the solid electrolyte is mixed with 2-4 wt % yttria stabilized zirconia (YSZ) or zirconium dioxide, also known as zirconium oxide ($ZrO_2$). This is particularly advantageous for improving the overcharge tolerance of the all-solid-state iron-empty battery. In one preferred embodiment, the solid electrolyte is a mixture of GDC and YSZ, wherein the YSZ content is 3 wt %.

Preferably, the separator is zirconia ($ZrO_2$) or yttria stabilized zirconia (YSZ). More preferably, the separator is a dense sheet or film with different thicknesses, which can be obtained by coating, evaporating, depositing, or the like. In particular, Ce ion in the solid electrolyte, such as GDC, SDC, LSGM, or the like, is prone to being reduced when the voltage is higher than 1.05V, which increases the electronic conductivity of the electrolyte. The separator of the present invention can effectively isolate the positive and negative electrodes and weaken the internal electronic conductivity to reduce the internal charge loss of the battery.

Preferably, the negative electrode is at least one ferrite material selected from a group consisting of potassium-doped iron oxide, sodium-doped iron oxide and lithium-doped iron oxide. In particular, the conductivity and catalytic activity of iron oxide itself are very low, but the conductivity and catalytic activity of alkali metal-doped iron oxide are greatly improved. More preferably, the iron oxide is doped with the alkali metal by the molten salt method.

Preferably, the negative electrode is mixed with yttria stabilized zirconia (YSZ) or zirconium dioxide ($ZrO_2$). This is particularly advantageous for improving the contact between the negative electrode and the separator. More preferably, the negative electrode is a mixture of potassium-doped iron oxide and yttria stabilized zirconia (YSZ), a mixture of sodium-doped iron oxide and zirconium dioxide ($ZrO_2$), or a mixture of lithium doped iron oxide and yttria stabilized zirconia (YSZ). More preferably, the molar ratio of potassium-doped iron oxide to YSZ is 1:1, the molar ratio of sodium-doped iron oxide to $ZrO_2$ is 1:1, or the molar ratio of lithium-doped iron oxide to YSZ is 2:1. It should be understood that the incorporation of YSZ can also improve the conductivity of the negative electrode.

Preferably, the all-solid-state iron-air battery further comprises a lead directly connected to the negative and positive electrodes at opposite ends.

Preferably, the lead is Ag wire, stainless steel, or Ni wire.

According to the all-solid-state iron-air battery of the present invention, in the negative electrode, by introducing the alkali metal into an iron oxide crystal lattice by means of doping, the volume of the iron oxide unit cell can be significantly increased, wherein the unit cell integrity can be maintained during the iron embedding/removal process, so that the problem of lattice collapse caused by the redox of iron during the battery charging and discharging process can be prevented, and the structural stability of the battery can be effectively improved. That is to say, the electrochemical reaction activity of the iron electrode can be remarkably improved, the potential safety hazard problem caused by battery overcharging is improved, and the performance of the iron-air battery is remarkably improved. According to the all-solid-state iron-air battery of the present invention, the separator has an excellent oxygen ion conduction performance at a high temperature, and its potential window is greater than the redox potential of iron, thus the battery electric leakage problem can be effectively relieved by the separator arranged between the solid electrolyte and the negative electrode. In short, according to the all-solid-state iron-air battery of the present invention, without liquid electrolyte, the battery can be moved as desired and the problem of short-circuit, caused by the contact of positive and negative electrodes and resulted from the electrolyte volatilization and drying up, can be effectively solved. The all-solid-state iron-air battery of the present invention has good oxygen ion conductivity, without the problems of volatilization, readiness to flow and corrosion of high-temperature molten salt, which significantly reduces the cost of the battery. In addition, the efficient negative electrode cooperating with the separator can reduce battery electric leakage behavior, with high safety, green environmental protection and long service life.

BRIEF DESCRIPTION OF THE DRAWINGS

FIG. 1 is a structural schematic diagram of an all-solid-state iron-air battery according to a preferred embodiment of the present invention;

FIG. 2 is a schematic diagram of a battery charge-discharge curve according to Example 1 of the present invention;

FIG. 3 is a schematic diagram of a battery charge-discharge curve according to Example 2 of the present invention;

DESCRIPTION OF THE ENABLING EMBODIMENT

Figure 4:
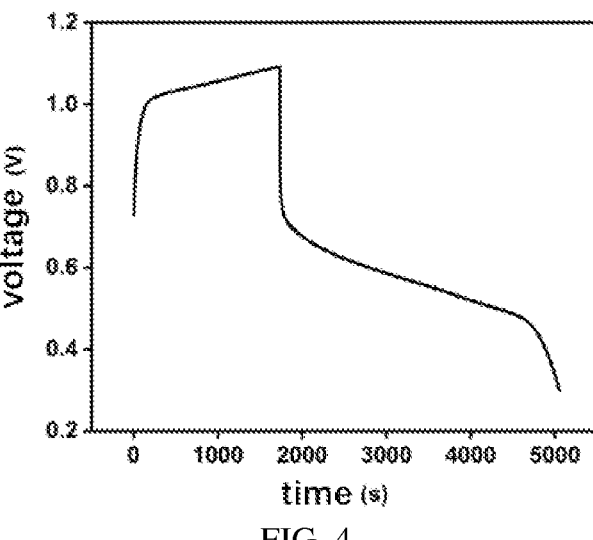
FIG. 4 is a schematic diagram of a battery charge-discharge curve according to Example 3 of the present invention.

In conjunction with the accompanying drawings, preferred embodiments of the present invention are given and described in detail below.

As shown in FIG. 1, according to a preferred embodiment of the present invention, an all-solid-state iron-air battery comprises a negative electrode 1, a separator 2, a solid electrolyte 3, a positive electrode 4 and a lead 5, wherein the negative electrode 1 and the positive electrode 4 are respectively arranged on opposite sides of the solid electrolyte 3, wherein the separator 2 is arranged between the negative electrode 1 and the solid electrolyte 3 to form a sandwich structure, and wherein the lead 5 is directly connected to the negative electrode 1 and the positive electrode 4 at the opposite ends.

Example 1

The negative electrode 1 was potassium-doped iron oxide+YSZ (1:1), the separator 2 was $ZrO_2$, the solid electrolyte 3 was GDC, the positive electrode 4 was Ag, and the lead 5 was Ag.

$ZrO_2$ was deposited on one side of the GDC sheet by ion sputtering method. The negative electrode material was then coated on $ZrO_2$. The Ag paste was then applied to the other side of the GDC sheet. The Ag wire was finally led out as the lead, wherein the ends of the Ag wire were fixed by the Ag paste. After the Ag paste was cured, the battery was put into an electric furnace at 600° C. to maintain a constant temperature for a charge-discharge test. During the test, a working electrode of the China Landian battery test system was used to connect to the positive and negative electrodes of the battery. The charging current was set to 10 mA. The charging time was set to 30 min. The discharging current was set to 10 mA. The final discharging voltage was set to 0.3V. Then the battery charge-discharge curve was obtained.

As shown by the GDC electrolyte charge-discharge curve in FIG. 2, the charging current was 10 mA, the charging voltage was about 1.08 V, the discharging current was 10 mA, and the final discharging voltage was about 0.3 V.

Example 2

The negative electrode 1 was sodium-doped iron oxide+$ZrO_2$ (1:1), the separator 2 was $ZrO_2$, the solid electrolyte 3 was LSGM, the positive electrode 4 was Ag, and the lead 5 was Ag.

$ZrO_2$ was deposited on one side of the LSGM sheet by atomic layer depositing method. The negative electrode material was then coated on $ZrO_2$. The Ag paste was then applied to the other side of the LSGM sheet. The Ag wire was finally led out with as the lead, wherein the ends of the Ag wire were fixed by the Ag paste. After the Ag paste was cured, the battery was put into an electric furnace at 750° C. to maintain a constant temperature for a charge-discharge test. During the test, a working electrode of the China Landian battery test system was used to connect to the positive and negative electrodes of the battery. The charging current was set to 10 mA. The charging time was set to 30 min. The discharging current was set to 10 mA. The final discharging voltage was set to 0.3V. Then the battery charge-discharge curve was obtained.

As shown by the LSGM electrolyte charge-discharge curve in FIG. 3, the charging current was 10 mA, the charging voltage was about 1.13V, the discharging current was 10 mA, and the final discharging voltage was about 0.3V.

Example 3

The negative electrode 1 was lithium-doped iron oxide+YSZ (2:1), the separator 2 was $ZrO_2$, the solid electrolyte 3 was YSZ, the positive electrode 4 was Ag, and the lead 5 was Ag.

$ZrO_2$ was deposited on one side of the YSZ sheet by atomic layer depositing method. The negative electrode material was then coated on $ZrO_2$. The Ag paste was then applied to the other side of the YSZ sheet. The Ag wire was finally led out as the lead, wherein the ends of the Ag wire were fixed by the Ag paste. After the Ag paste was cured, the battery was put into an electric furnace at 850° C. to maintain a constant temperature for a charge-discharge test. During the test, a working electrode of the China Landian battery test system was used to connect to the positive and negative electrodes of the battery. The charging current was set to 10 mA. The charging time was set to 30 min. The discharging current was set to 10 mA. The final discharging voltage was set to 0.3V. Then the battery charge-discharge curve was obtained.

As shown by the YSZ electrolyte charge-discharge curve in FIG. 4, the charging current was 10 mA, the charging voltage was about 1.15V, the discharging current was 10 mA, and the final discharging voltage was about 0.3V.

Example 4

The negative electrode 1 was potassium-doped iron oxide+YSZ (1:1), the separator 2 was $ZrO_2$, the solid electrolyte 3 was YSZ, the positive electrode 4 was Ag, and the lead 5 was Ag.

$ZrO_2$ was deposited on one side of the YSZ sheet by ion sputtering method. The negative electrode material was then coated on $ZrO_2$. The Ag paste was then applied to the other side of the YSZ sheet. The Ag wire was finally led out as the lead, wherein the ends of the Ag wire were fixed by the Ag paste. After the Ag paste was cured, the battery was put into an electric furnace at 850° C. to maintain a constant temperature for a charge-discharge test. During the test, a working electrode of the China Landian battery test system was used to connect to the positive and negative electrodes of the battery. The charging current was set to 10 mA. The charging time was set to 60 min. The discharging current was set to 10 mA. The final discharging voltage was set to 0.5V. Then the battery charge-discharge curve was obtained.

Figure 5:
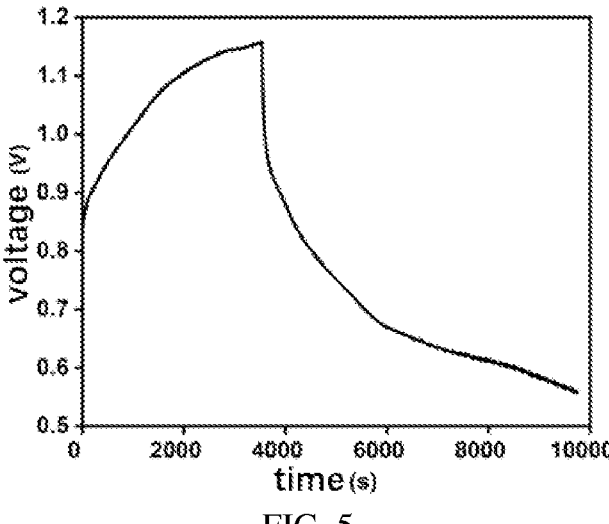
FIG. 5 is a schematic diagram of a battery charge-discharge curve according to Example 4 of the present invention.

As shown by the iron oxide electrode charge-discharge curve in FIG. 5, the charging current was 10 mA, the charging voltage was about 1.18V, the discharging current was 10 mA, and the final discharging voltage was about 0.5V.

Example 5

The negative electrode 1 was potassium-doped iron oxide+YSZ (1:1), the separator 2 was YSZ, the solid electrolyte 3 was GDC+YSZ (YSZ content being 3 wt %), the positive electrode 4 was Ag, and the lead 5 was Ag.

YSZ was deposited on one side of the GDC+YSZ sheet by ion sputtering method. The negative electrode material was then applied to YSZ. The Ag paste was then applied to the other side of the GDC+YSZ sheet. The Ag wire was finally led out as the lead, wherein the ends of the Ag wire were fixed by the Ag paste. After the Ag paste was cured, the battery was put into an electric furnace at 850° C. to maintain a constant temperature for a charge-discharge test. During the test, a working electrode of the China Landian battery test system was used to connect to the positive and negative electrodes of the battery. The charging current was set to 10 mA. The charging time was set to 30 min. The discharging current was set to 10 mA. The final discharging voltage was set to 0.3V. Then the battery charge-discharge curve was obtained.

Figure 6:
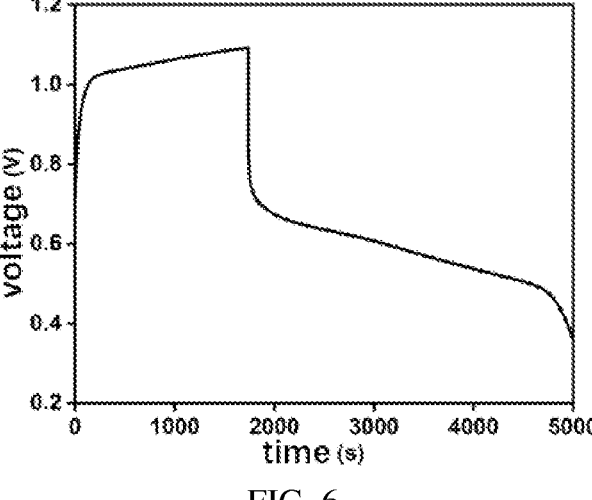
FIG. 6 is a schematic diagram of a battery charge-discharge curve according to Example 5 of the present invention.

As shown by the YSZ separator charge-discharge curve in FIG. 6, the charging current was 10 mA, the charging voltage was about 1.15 V, the discharging current was 10 mA, and the final discharging voltage was about 0.5V.

The foregoing description refers to preferred embodiments of the present invention, and is not intended to limit the scope of the present invention. Various changes can be made to the foregoing embodiments of the present invention. That is to say, all simple and equivalent changes and modifications made in accordance with the claims of the present invention and the content of the description fall into the protection scope of the patent of the present invention. What is not described in detail in the present invention is conventional technical content.

The invention claimed is:

1. An all-solid-state iron-air battery, comprising a positive electrode, a negative electrode, a separator and a solid electrolyte, wherein the positive electrode and the negative electrode are respectively arranged on opposite sides of the solid electrolyte; the separator is arranged between the negative electrode and the solid electrolyte to form a sandwich structure; the negative electrode is a ferrate material formed from an alkali metal-doped iron oxide; the positive electrode is a metal or a metal oxide material with an efficient redox catalytic activity; the solid electrolyte is at least one oxygen ion conductor selected from a group consisting of doped cerium oxide, alkaline metal-doped lanthanum gallate and scandium oxide stabilized zirconia, mixed with 2-4 wt % yttria stabilized zirconia (YSZ); and the separator is a film-like or sheet-like yttria stabilized zirconia material having oxygen ion conduction and electronic insulation performances.

2. The all-solid-state iron-air battery according to claim 1, wherein the positive electrode is at least one metal or metal oxide conductive material selected from a group consisting of silver, platinum, lanthanum strontium manganite (LSM), strontium-doped lanthanum ferrite-cobaltite (LSFCO) and barium strontium cobalt ferrite.

3. The all-solid-state iron-air battery according to claim 1, wherein the solid electrolyte is an oxygen ion conductor suitable for operating at the temperature of 600-1000° C.

4. The all-solid-state iron-air battery according to claim 1, wherein the negative electrode is at least one ferrite material selected from a group consisting of potassium-doped iron oxide, sodium-doped iron oxide and lithium-doped iron oxide.

5. The all-solid-state iron-air battery according to claim 1, wherein the negative electrode is mixed with yttria stabilized zirconia or zirconium oxide.

6. The all-solid-state iron-air battery according to claim 1, wherein the all-solid-state iron-air battery further comprises a lead directly connected to the negative and positive electrodes at both ends.

7. The all-solid-state iron-air battery according to claim 6, wherein the lead is Ag wire, stainless steel, or Ni wire.

* * * * *